INVENTOR.
Frederick E. England
BY
Donald E. Payne
ATTORNEY

Patented Nov. 27, 1951

2,576,504

UNITED STATES PATENT OFFICE 2,576,504

HORIZONTAL TRANSPORT OF SOLIDS

Frederick E. England, Homewood, Ill., assignor to Standard Oil Company, Chicago, Ill., a corporation of Indiana Application June 25, 1949, Serial No. 101,333

5 Claims. (Cl. 302—53)

1

This invention relates to an improved method and means for effecting horizontal transport of solids particles and it pertains more particularly to the handling of fluidized solids such, for example, as powdered catalyst employed in hydrocarbon conversion processes.

It is well known that a mass of solids of small particle size may be fluidized, i. e., rendered fluent or liquid-like, by passing a gas upwardly therethrough at certain velocities which in most cases are of the order of about .5 to 3 feet per second. The individual particles apparently become separated from each other by a gaseous film and the upflowing gas stream maintains the solids in a state of more or less turbulent suspension. A mass of fluidized solids remains in this fluent or liquid-like condition only as long as the particles remain separated from each other by the gaseous film, i. e., remain in gaseous suspension. In flowing systems exemplified by fluid catalytic cracking processes, solids remain fluidized during their passage through standpipes of considerable length provided that the rate of flow is sufficiently rapid to prevent substantial deaeration and/or that aeration gas is introduced to overcome tendencies toward deaeration. While fluidized solids may be transported in horizontal conduits for very short distances when the flow rate is sufficiently high, flow in substantially horizontal conduits of appreciable length has not been feasible because of the tendency of the solids to settle out and the tendency of the gas to flow along the upper portion of the conduit above settled solids. This tendency of solids to settle out of a fluidized phase is particularly marked at the low flow rates which characterize fluidized solids handling as distinguished from pneumatic conveying.

An object of my invention is to provide an improved method and means for preventing the settling of solids out of the suspending gas stream when such solids are being conveyed as a fluidized mass through a substantially horizontal conduit.

A further object of the invention is to provide an improved method and means for contacting solids with a fluid stream in a substantially horizontal conduit or chamber. A further object is to provide an improved system for conveying solids, such as powdered coal, powdered ore, powdered shale, finely divided sand, flour, cement, sugar, salt, wheat or other grains, etc., through substantially horizontal conduits over long distances without the necessity of employing any moving parts in the conduit. A further object is to provide an improved method and means for obtaining catalytic conversion with fluidized solids. Other objects will be apparent as the detailed description of the invention proceeds.

In accordance with my invention a substantially horizontal conduit is provided with a fixed, "eccentric," helical insert to provide a substantially helical path of flow in the conduit wherein the upper portion of each convolution is of larger

2 cross-sectional area than the lower part thereof. The insert comprises a shaft whose diameter is preferably about 10% to 30% that of the conduit and which extends through the conduit parallel to the axis thereof but in off-set or eccentric position so that it is closer to the bottom than the top and also preferably closer to one side than the other of the conduit, the distance between the shaft and the remote portion of the conduit wall being about 1.5 to 5 times the distance between the shaft and adjacent portion of the wall. Around the eccentric shaft, I provide a fixed helical baffle or fin which extends from the shaft to the conduit walls and which has a pitch which is greater than the angle of repose of solids to be transported, usually about 30° to 50°. Although a single helical may be employed, I prefer to employ about 2 to 4 thereof in order to provide 2 to 4 separate helical paths of flow instead of a single helical path of flow. The eccentric mounting of the shaft causes the effective cross-sectional area of the helical path of flow to be substantially less at the bottom-upflow portion than at the top-downflow portion. Since the gas is travelling through the conduit as a whole at a uniform rate, the velocity of the gas at the bottom-upflow portion of the conduit will be 1½ to 5 times the velocity which is maintained at the top-downflow portion. This increased velocity at the bottom-upflow portion of each spiral convolution prevents settling out of solids and effects actual sweeping of solids from that portion of the spiral flow where settling would otherwise be encountered. In the larger top-downflow portion of each convolution the gas velocity is decreased so that the bulk density of the fluidized mass can be maintained at the desired value.

The invention will be more clearly understood from the following detailed description of illustrative examples read in conjunction with the accompanying drawings which form a part of the specification and in which.

Figure 1:
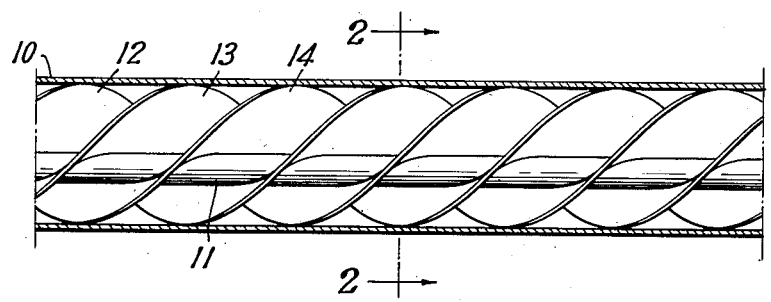
Figure 1 is a plan view illustrating the arrangement of eccentric shaft and fixed helical baffle of a horizontal conduit.

Referring to Figure 1, horizontal conduit 10 may be a steel pipe about one foot in diameter. Within this conduit is an eccentrically mounted shaft 11 which may be about three inches in diameter and which may be solid or hollow. Wound around shaft 11 are three helical strips 12, 13 and 14, each extending from the shaft to the conduit wall and being in fixed position with respect to both. By employing three helical flights, each having a pitch of about 45°, the outer distance from the crest of each flight to the adjacent flight is substantially the same as the diameter of the conduit.

Figure 2:
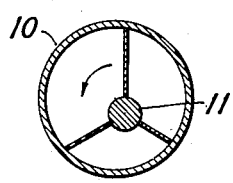
Figure 2 is a section taken along the lines 2—2 of Figure 1.

Referring to Figure 2, it will be seen that the center of the shaft 11 is off-set about 1½ inches from the center of the conduit and in approximately 5 o'clock position. With flow of fluidized solids from left to right in conduit 10, the fluidized solids stream will flow in a counterclockwise direction around shaft 11. The maximum tendency for solids to settle out occurs in the bottom-upflow portion where the effective cross-sectional area of the helical path of flow is at a minimum so that the gas velocity will be at a maximum. Thus, in this case the gas velocity at the point where settling would normally occur is twice the gas velocity at the top-downflow portion of the helical path.

The system illustrated in Figures 1 and 2 may be employed for transporting any solids of small particle size by means of a relatively low velocity gaseous stream so that throughout the conduit the solids may be handled as a liquid and so that the flow may be effected by the use of simple pressure drop rather than by employing pneumatic conveying principles. With ordinary catalytic cracking catalyst, such as treated Mountmorillonite clay, silica alumina, silica magnesia, etc., wherein the particle size is chiefly in the range of about 1 to 100 microns, average solids density in the conduit may be maintained at about 20 to 30 pounds per cubic foot, and the rate of flow through the conduit may be regulated by the pressure drop across the conduit in a manner analogous to liquid flow. The improved feature is that in this system the tendency for the solids to settle out of the fluidized mass is eliminated by the increased gas velocity at those portions in the helical flow path where settling would normally occur.

Figure 3:
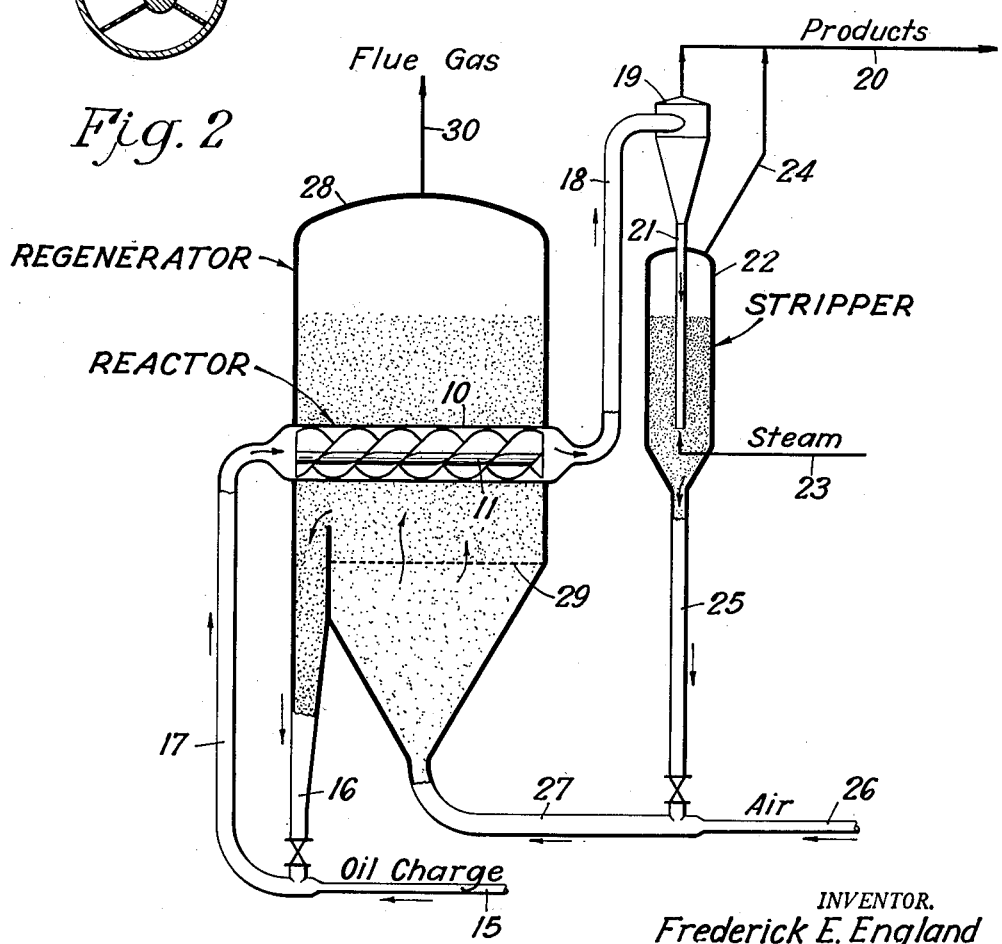
Figure 3 is a schematic flow diagram of a catalytic cracking system employing my improved horizontal transfer system in the reactor side thereof.

In Figure 3, I have illustrated the application of my invention to a fluid catalytic cracking system wherein a highly active silica-alumina or silica-magnesia catalyst is employed for effecting conversion of gas oil into high quality motor fuel. In this particular example, conduit 10 constitutes the reactor and it is preferably mounted within the regenerator so that heat of combustion may be transferred directly to the walls of the reactor for supplying endothermic heat of cracking. The charging stock, which may be preheated and either partially or completely vaporized, is introduced through line 15. It picks up hot regenerated catalyst from the base of standpipe 16 and conveys it by transfer line 17 to the inlet end of conduit 10 which serves as the reactor. The charging stock and catalyst move concurrently through the reactor in the manner hereinbefore described and during its passage through the reactor, conversion of the charging stock is obtained. The helical flow of solids through the conduit tends to keep the inside surfaces of the conduit free from carbonaceous deposits.

The solids discharged from conduit 10 are conveyed by line 18 to cyclone separator 19 from which products are withdrawn by line 20 to a conventional recovery system. Separated solids pass through standpipe dip leg 21 into a dense solids phase in stripper 22 into which stripping steam is introduced by line 23, the stripped products being discharged through line 24, preferably to the product recovery system. The stripped solids then flow downwardly as an aerated mass through standpipe 25 from the base of which they are picked up by air introduced through line 26, the suspension being conveyed in dilute phase by line 27 to the base of regenerator 28 which is provided with a conventional distributor grid 29. The regenerator is operated in the conventional manner to maintain a turbulent dense phase superimposed by a light dilute phase and internal cyclones (not shown) may be employed to avoid loss of catalyst with flue gas which is vented through line 30. The concurrent flow of charging stock with catalyst through the reactor in this system offers an advantage over current practice in that the catalyst withdrawn from the reactor is uniformly spent while the catalyst withdrawn from the conventional reactors constitutes a mixture of relatively spent and relatively active catalyst. By mounting the reactor within the regenerator, additional endothermic heat of conversion may be directly supplied by exothermic heat of regeneration, the helical flow through the reactor serving to keep the reactor walls clean while simultaneously preventing a settling of solids from the fluidized mass flowing therethrough.

While the invention has thus been described as applied to simple conveying and to a catalytic cracking system, it should be understood that these are merely stated by way of example and that the invention is widely applicable as will be apparent from the above description to those skilled in the art.

I claim:

1. Apparatus for conveying solids of small particle size under fluidized conditions in a substantially horizontal direction, which apparatus comprises a conduit having inner walls, an eccentrically mounted shaft in said conduit which is nearer the bottom than the top thereof, and a helical baffle fixedly disposed between said shaft and the inner walls of said conduit to provide a helical path of flow in which the upper portions are of larger cross-sectional area than the lower portions.

2. The apparatus of claim 1 which includes a plurality of helical baffles fixedly disposed between said shaft and the inner walls of said conduit.

3. The apparatus of claim 1 wherein the distance between the eccentric shaft and the most remote portion of the conduit wall is 1.5 to 5 times the distance between the said shaft and the most adjacent portion of the conduit wall.

4. The apparatus of claim 1 wherein the pitch of the helical baffle is greater than the angle of repose of the solid particles.

5. The apparatus of claim 1 wherein the pitch of the helical baffles is in the range of 30° to 50°.

FREDERICK E. ENGLAND.

REFERENCES CITED

The following references are of record in the file of this patent:

UNITED STATES PATENTS

| Number | Name | Date |
|---|---|---|
| 329,490 | Salzgeber | Nov. 3, 1885 |
| 544,970 | Dodge | Aug. 20, 1895 |
| 808,752 | Isaacs et al. | Jan. 2, 1906 |
| 857,096 | McCord | June 18, 1907 |
| 1,058,431 | Hilliard | Apr. 8, 1913 |
| 1,707,335 | Van Brunt | Apr. 2, 1929 |
| 2,464,812 | Johnson | Mar. 22, 1949 |
| 2,478,326 | Scarth | Aug. 9, 1949 |

FOREIGN PATENTS

| Number | Country | Date |
|---|---|---|
| 491,075 | Germany | Feb. 17, 1930 |